(12) United States Patent
Filatov (10) Patent No.: US 9,683,601 B2
(45) Date of Patent: Jun. 20, 2017

(54) GENERATING RADIAL ELECTROMAGNETIC FORCES

(71) Applicant: Calnetix Technologies, LLC, Cerritos, CA (US)

(72) Inventor: Alexei Filatov, Irvine, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 665 days.

(21) Appl. No.: 13/831,213

(22) Filed: Mar. 14, 2013

(65) Prior Publication Data

US 2014/0265689 A1    Sep. 18, 2014

(51) Int. Cl.
*H02K 7/09* (2006.01)
*F16C 32/04* (2006.01)

(52) U.S. Cl.
CPC ........ *F16C 32/048* (2013.01); *F16C 32/0414* (2013.01); *F16C 32/0463* (2013.01); *F16C 32/0465* (2013.01)

(58) Field of Classification Search
CPC ...... H02K 7/09; H02K 21/04; F16C 32/0463; F16C 32/0414; F16C 32/048; F16C 32/0465
USPC .................................. 310/90.5, 153, 181, 49
IPC .............................................. H02K 7/09,21/04
See application file for complete search history.

(56) References Cited

U.S. PATENT DOCUMENTS

| 1,916,256 | A | 7/1933 | Chandeysson |
| 2,276,695 | A | 3/1942 | Lavarello |
| 2,345,835 | A | 4/1944 | Serduke |
| 2,409,857 | A | 10/1946 | Hines et al. |
| 2,917,636 | A | 12/1959 | Akeley |
| 3,060,335 | A | 10/1962 | Greenwald |
| 3,064,942 | A | 11/1962 | Martin |
| 3,243,692 | A | 3/1966 | Heissmeier et al. |
| 3,439,201 | A | 4/1969 | Levy et al. |
| 3,937,533 | A | 2/1976 | Veillette |

(Continued)

FOREIGN PATENT DOCUMENTS

| DE | 102006004836 A1 | 5/2007 |
| EP | 774824 | 5/1997 |

(Continued)

OTHER PUBLICATIONS

Dr. Oppelt et al, "magnetic field strength", on Jul. 2007.*

(Continued)

*Primary Examiner* — John K Kim
(74) *Attorney, Agent, or Firm* — Fish & Richardson P.C.

(57) ABSTRACT

An electromagnetic actuator can exert a radial electromagnetic force on a body that is configured to rotate about a rotational axis. The actuator includes a radial control magnetic pole assembly that includes radial control poles adjacent to and spaced apart by air gaps from the body. The actuator includes a permanent magnet (PM) magnetized along the axis, having one pole in contact with an axial face of the assembly and located proximate to a lateral surface of the body. The PM is magnetically coupled to the body in a non-contact manner resulting in a bias magnetic flux in the air gaps. The actuator includes a control coil around the radial control poles located radially outwards from the PM. Electrical current in the coils generates control magnetic flux in air gaps. The non-uniform net magnetic flux distribution around the body results in a radial electromagnetic force exerted on the body.

11 Claims, 6 Drawing Sheets

(56) References Cited

U.S. PATENT DOCUMENTS

| | | | |
|---|---|---|---|
| 3,943,443 A | 3/1976 | Kimura et al. | |
| 4,093,917 A | 6/1978 | Haeussermann | |
| 4,127,786 A | 11/1978 | Volkrodt | |
| 4,170,435 A | 10/1979 | Swearingen | |
| 4,260,914 A | 4/1981 | Hertrich | |
| 4,358,697 A | 11/1982 | Liu et al. | |
| 4,362,020 A | 12/1982 | Meacher et al. | |
| 4,415,024 A | 11/1983 | Baker | |
| 4,535,289 A | 8/1985 | Abe et al. | |
| 4,560,928 A | 12/1985 | Hayward | |
| 4,635,712 A | 1/1987 | Baker et al. | |
| 4,639,665 A | 1/1987 | Gary | |
| 4,642,501 A | 2/1987 | Kral et al. | |
| 4,659,969 A | 4/1987 | Stupak | |
| 4,731,579 A | 3/1988 | Petersen et al. | |
| 4,740,711 A | 4/1988 | Sato et al. | |
| 4,806,813 A | 2/1989 | Sumi et al. | |
| 4,918,345 A * | 4/1990 | Vaillant de Guelis | F16C 32/0459 104/281 |
| 4,920,291 A | 4/1990 | McSparran | |
| 4,948,348 A | 8/1990 | Doll et al. | |
| 4,963,775 A * | 10/1990 | Mori | H02K 37/10 310/181 |
| 5,003,211 A | 3/1991 | Groom | |
| 5,083,040 A | 1/1992 | Whitford et al. | |
| 5,115,192 A | 5/1992 | Bardas et al. | |
| 5,216,308 A * | 6/1993 | Meeks | F16C 32/0459 310/90.5 |
| 5,231,323 A | 7/1993 | New | |
| 5,241,425 A | 8/1993 | Sakamoto et al. | |
| 5,315,197 A | 5/1994 | Meeks et al. | |
| 5,481,145 A | 1/1996 | Canders et al. | |
| 5,514,924 A * | 5/1996 | McMullen | F16C 32/0485 310/90.5 |
| 5,559,379 A | 9/1996 | Voss | |
| 5,589,262 A | 12/1996 | Kiuchi et al. | |
| 5,627,420 A | 5/1997 | Rinker et al. | |
| 5,672,047 A | 9/1997 | Birkholz | |
| 5,739,606 A | 4/1998 | Takahata et al. | |
| 5,767,597 A | 6/1998 | Gondhalekar | |
| 5,831,431 A | 11/1998 | Gottfried-Gottfried et al. | |
| 5,939,879 A | 8/1999 | Wingate et al. | |
| 5,942,829 A | 8/1999 | Huynh | |
| 5,994,804 A | 11/1999 | Grennan et al. | |
| 6,087,744 A | 7/2000 | Glauning | |
| 6,130,494 A | 10/2000 | Schöb | |
| 6,148,967 A | 11/2000 | Huynh | |
| 6,167,703 B1 | 1/2001 | Rumez et al. | |
| 6,191,511 B1 | 2/2001 | Zysset | |
| 6,259,179 B1 | 7/2001 | Fukuyama et al. | |
| 6,268,673 B1 | 7/2001 | Shah et al. | |
| 6,270,309 B1 | 8/2001 | Ghetzler et al. | |
| 6,304,015 B1 | 10/2001 | Filatov et al. | |
| 6,313,555 B1 | 11/2001 | Blumenstock et al. | |
| 6,325,142 B1 | 12/2001 | Bosley et al. | |
| 6,359,357 B1 | 3/2002 | Blumenstock | |
| 6,437,468 B2 | 8/2002 | Stahl et al. | |
| 6,465,924 B1 | 10/2002 | Maejima | |
| 6,664,680 B1 | 12/2003 | Gabrys | |
| 6,700,258 B2 * | 3/2004 | McMullen | F16C 32/0476 310/90.5 |
| 6,727,617 B2 | 4/2004 | McMullen et al. | |
| 6,794,780 B2 | 9/2004 | Silber et al. | |
| 6,856,062 B2 | 2/2005 | Heiberger et al. | |
| 6,876,194 B2 | 4/2005 | Lin et al. | |
| 6,885,121 B2 | 4/2005 | Okada et al. | |
| 6,897,587 B1 | 5/2005 | McMullen et al. | |
| 6,925,893 B2 | 8/2005 | Abe et al. | |
| 6,933,644 B2 | 8/2005 | Kanebako | |
| 7,042,118 B2 | 5/2006 | McMullen et al. | |
| 7,135,857 B2 | 11/2006 | Johnson | |
| 7,217,039 B2 | 5/2007 | Baudelocque et al. | |
| 7,557,480 B2 | 7/2009 | Filatov | |
| 7,635,937 B2 | 12/2009 | Brunet et al. | |
| 7,847,453 B2 * | 12/2010 | Kim | F16C 32/0425 310/181 |
| 8,169,118 B2 * | 5/2012 | Filatov | F16C 32/0465 310/178 |
| 2001/0017500 A1 | 8/2001 | Hirama et al. | |
| 2001/0030471 A1 | 10/2001 | Kanebako | |
| 2002/0006013 A1 | 1/2002 | Sato et al. | |
| 2002/0175578 A1 | 11/2002 | McMullen et al. | |
| 2003/0155829 A1 | 8/2003 | McMullen et al. | |
| 2003/0197440 A1 | 10/2003 | Hasegawa et al. | |
| 2004/0135450 A1 | 7/2004 | Kanebako | |
| 2004/0150278 A1 | 8/2004 | Okada et al. | |
| 2005/0093391 A1 | 5/2005 | McMullen et al. | |
| 2005/0242671 A1 * | 11/2005 | Lin | H02K 37/18 310/49.33 |
| 2007/0056285 A1 | 3/2007 | Brewington | |
| 2007/0063594 A1 | 3/2007 | Huynh | |
| 2007/0164627 A1 | 7/2007 | Brunet et al. | |
| 2007/0200438 A1 | 8/2007 | Kaminski et al. | |
| 2007/0296294 A1 | 12/2007 | Nobe et al. | |
| 2008/0211354 A1 * | 9/2008 | Kim | F16C 32/0425 310/49.34 |
| 2008/0211355 A1 | 9/2008 | Sakamoto et al. | |
| 2008/0246373 A1 | 10/2008 | Filatov | |
| 2008/0252078 A1 | 10/2008 | Myers | |
| 2009/0004032 A1 | 1/2009 | Kaupert | |
| 2009/0201111 A1 | 8/2009 | Filatov | |
| 2009/0295244 A1 | 12/2009 | Ries | |
| 2010/0007225 A1 | 1/2010 | Platon et al. | |
| 2010/0090556 A1 | 4/2010 | Filatov | |
| 2010/0117627 A1 | 5/2010 | Filatov | |
| 2010/0215526 A1 | 8/2010 | Saari et al. | |
| 2010/0231076 A1 | 9/2010 | Chiba et al. | |
| 2010/0301840 A1 | 12/2010 | Filatov | |
| 2011/0101905 A1 | 5/2011 | Filatov | |
| 2011/0163622 A1 | 7/2011 | Filatov et al. | |
| 2011/0234033 A1 | 9/2011 | Filatov | |
| 2012/0306305 A1 | 12/2012 | Filatov | |
| 2014/0265689 A1 * | 9/2014 | Filatov | F16C 32/0463 310/90.5 |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |
| WO | 2009/094541 A2 | 7/2009 |

OTHER PUBLICATIONS

Office action issued in U.S. Appl. No. 13/735,468 on Sep. 3, 2014, 16 pages.

Final Office Action issued in U.S. Appl. No. 13/486,194 on Jun. 25, 2015, 15 pages.

Non Final Office Action issued in U.S. Appl. No. 13/486,194 on Feb. 23, 2015, 16 pages.

Amendment filed in U.S. Appl. No. 13/486,194 on May 26, 2015, 17 pages.

European Search Report, Application No. 12169515.9, Aug. 1, 2013, 3 pages.

Notice of Allowance issued in U.S. Appl. No. 13/735,468 on Feb. 2, 2015, 5 pages.

U.S. Appl. No. 12/569,559, filed Sep. 29, 2009, Filatov.

U.S. Appl. No. 12/985,911, filed Jan. 6, 2011, Filatov.

U.S. Appl. No. 13/045,379, filed Mar. 10, 2011, Filatov.

U.S. Appl. No. 13/116,991, filed May 26, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

(56) References Cited

OTHER PUBLICATIONS

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.
Honeywell, "Genetron® 245fa Applications Development Guide," (15 pages), 2000.
Hawkins, Lawrence A. et al., "Analysis and Testing of a Magnetic Bearing Energy Storage Flywheel with Gain-Scheduled, Mimo Control," Proceedings of ASME Turboexpo 2000, Munich, Germany, May 8-11, 2000, pp. 1-8.
McMullen, Patrick T. et al., "Combination Radial-Axial Magnetic Bearing," Seventh International Symposium on Magnetic Bearings, ETH Zurich, Aug. 23-25, 2000, pp. 473-478.
Hawkins, Lawrence et al., "Shock and Vibration Testing of an AMB Supported Energy Storage Flywheel," 8th International Symposium on Magnetic Bearings, Mito, Japan, Aug. 26-28, 2002, 6 pages.
McMullen, Patrick T. et al., "Design and Development of a 100 KW Energy Storage Flywheel for UPS and Power Conditioning Applications," 24th International PCIM Conference, Nuremberg, Germany, May 20-22, 2003, 6 pages.
Hawkins, Larry et al., "Development of an AMB Energy Storage Flywheel for Industrial Applications," 7th International Symposium on Magnetic Suspension Technology, Fukoka, Japan, Oct. 2003, 5 pages.
Freepower FP6,. "Freepower FP6 Specification & Dimensions for 6kWe Electricity Generating Equipment," (2 pages), 2000-2004, printed Jul. 26, 2006.
Hawkins, Larry et al., "Development of an AMB Energy Storage Flywheel for Commercial Application," International Symposium on Magnetic Suspension Technology, Dresden, Germany, Sep. 2005, 5 pages.
Freepower ORC Electricity Company with Industrial Processes, "Industrial Processes," (1 page), available at http://www.freepower.co.uk/site-5.htm, 2000-2006, printed Jul. 26, 2006.
Freepower ORC Electricity Company FP6 Product Description, "FP6," (1 page), available at http://www.freepower.co.uk/fp6.htm, 2000-2006, printed Jul. 26, 2006.
Freepower ORC Electricity Company FP120 Product Description, "FP120," (1 page), available at http://www.freepower.co.uk/fp120.htm, 2000-2006, printed Jul. 26, 2006.
Freepower ORC Electricity Company FP60 Product Description, "FP60," (1 page), available at http://www.freepower.co.uk/fp60.htm, 2000-2006, printed Jul. 26, 2006.
Freepower ORC Electricity Company Products Technical Overview "A System Overview," (1 page), available at http://www.freepower.co.uk/tech-overview.htm, 2000-2006, printed Jul. 26, 2006.
Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.
Huynh, Co et al., "Flywheel Energy Storage System for Naval Applications," GT 2006-90270, Proceedings of GT 2006 ASME Turbo Expo 2006: Power for Land, Sea & Air, Barcelona, Spain, May 8-11, 2006, pp. 1-9.
Freepower ORC Electricity Company Home Page, "Welcome to Freepower," (1 page) available at http://www.freepower.co.uk/, Jul. 18, 2006.
PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.
Ormat Web Site: "Recovered Energy Generation in the Cement Industry," (2 pages) available at http://www.ormat.com/technology_cement_2.htm, printed Jul. 26, 2006.
McMullen, Patrick et al., "Flywheel Energy Storage System with AMB's and Hybrid Backup Bearings," Tenth International Symposium on Magnetic Bearings, Martigny, Switzerland, Aug. 21-23, 2006, 6 pages.
International Search Report and Written Opinion of the International Searching Authority issued in International Application No. PCT/US2009/031837 on Sep. 7, 2009; 11 pages.
International Preliminary Report on Patentability issued in International Application No. PCT/US2009/031837 on Jul. 27, 2010, 6 pages.
International Search Report and Written Opinion of the International Searching Authority issued in International Application No. PCT/US2009/058816, mailed Jun. 10, 2010, 10 pages.
International Preliminary Report on Patentability issued in International Application No. PCT/US2009/058816 on Apr. 12, 2011, 5 pages.
Meeks, Crawford, "Development of a Compact, Lightweight Magnetic Bearing," 26th Annual AIAA/SAE/ASME/ASEE Joint Propulsion Conference, Jul. 16-18, 1990, 9 pages.
Ehmann et al., "Comparison of Active Magnetic Bearings With and Without Permanent Magnet Bias," Ninth International Symposium on Magnetic Bearings, Lexington, Kentucky, Aug. 3-6, 2004, 6 pages.
Office Action issued in U.S. Appl. No. 12/267,517 on Mar. 28, 2011, 9 pages.
Office Action issued in U.S. Appl. No. 12/569,559 on Apr. 25, 2011, 22 pages.
Notice of Allowance issued in U.S. Appl. No. 12/569,559 on Aug. 9, 2011, 9 pages.
Notice of Allowance issued in U.S. Appl. No. 12/358,172 on Sep. 20, 2011, 10 pages.
Notice of Allowance issued in U.S. Appl. No. 12/569,559 on Jan. 27, 2012, 6 pages.
Request for Continued Examination filed in U.S. Appl. No. 12/569,559 on Nov. 9, 2011, 13 pages.
Notice of Allowance issued in U.S. Appl. No. 12/267,517 on Feb. 21, 2012, 7 pages.
Amendment filed in U.S. Appl. No. 12/267,517 on Jan. 31, 2012, 9 pages.
Office Action issued in U.S. Appl. No. 12/475,052 on Jun. 19, 2012, 9 pages.
Office Action issued in U.S. Appl. No. 12/475,052 on Sep. 12, 2012, 8 pages.
Notice of Allowance issued in U.S. Appl. No. 12/610,766, on Oct. 19, 2012; 7 pages.
Office Action issued in U.S. Appl. No. 13/116,991 on Oct. 26, 2012; 13 pages.
Amendment filed in U.S. Appl. No. 12/475,052 on Dec. 12, 2012, 13 pages.
Sortore, Christopher K. et al., "Design of Permanent Magnet Biased Magnetic Bearings for a Flexible Rotor" Presentation at the 44th MFPG Meeting, Virginia Beach, VA, Apr. 2-5, 1990 (10 pages).
Notice of Allowance issued in U.S. Appl. No. 13/116,991 on Mar. 7, 2013, 7 pages.
Office Action issued in U.S. Appl. No. 13/045,379 on Jun. 21, 2013, 19 pages.
Office Action issued in U.S. Appl. No. 12/985,211 on Jul. 5, 2013, 16 pages.
Office Action issued in U.S. Appl. No. 12/985,911 on Jan. 16, 2014, 10 pages.
Final Office Action issued in U.S. Appl. No. 13/045,379 on Nov. 27, 2013, 19 pages.

\* cited by examiner

FIG. 1a

Section A-A
FIG. 1b

GENERATING RADIAL ELECTROMAGNETIC FORCES

FIELD

This disclosure relates to generating radial electromagnetic forces and supporting a body, at least in part, by a magnetic field.

BACKGROUND

Equipment and machinery often contain moving (e.g., rotating) members, which require support during operation. A bearing, or similar device, may be used to support the moving member. Although some types of bearings use direct contact with the member to provide the necessary support, others use non-contact, or nearly non-contact, support for the member. A magnetic bearing uses a magnetic field to apply force to, and thereby support, the moving member in a non-contact, or nearly non-contact, manner. A portion of a magnetic bearing that exerts an electromagnetic force on a body is commonly referred to as an electromagnetic actuator.

SUMMARY

An electromagnetic actuator may be used to generate an electromagnetic force in a radial direction on a body having a rotational axis. In some implementations, the electromagnetic actuator may include a radial control magnetic pole assembly concentric with the rotational axis. The radial control magnetic pole assembly may include at least three radial control poles adjacent to and spaced apart from a lateral surface of the body by radial gaps and configured to communicate magnetic flux with the lateral surface of the body. The body and the radial control poles may be magnetically coupled and define a radial control magnetic circuit.

The electromagnetic actuator may also include a permanent magnet magnetized in a direction parallel to the rotational axis. The permanent magnet may have a first pole in contact with an axially-facing surface of the radial control magnetic pole assembly and separated from the body by the radial gap. For example, in some implementations, the permanent magnet is located in close proximity of a lateral-facing surface of the body but does not come into mechanical contact with the lateral-facing surface of the body.

A second pole of the permanent magnet may have a pole piece attached to it configured to communicate magnetic flux with the lateral surface of the body. The body, the radial control magnetic pole assembly, the permanent magnet and the pole piece may define a bias magnetic circuit.

A control coil around each of the radial control poles may be located radially outwards from the permanent magnet and configured to produce control magnetic flux in the radial control magnetic control circuits. In other words, the permanent magnet resides in closer proximity to the rotor than does the control coil.

In certain instances, the electromagnetic actuator may also include a second permanent magnet magnetized along the rotational axis, having the same pole as the first permanent magnet in contact with the second axial face of the radial control magnetic pole assembly and located in a close proximity of the lateral surface of the body without coming to a mechanical contact with it.

The other pole of the second permanent magnet may have a second pole piece attached to it configured to communicate magnetic flux with the lateral surface of the body. The body, the radial control magnetic pole assembly, the second permanent magnet and the second pole piece may define a second bias magnetic circuit.

In certain instances, the body may comprise a low reluctance target adapted to communicate magnetic flux.

In certain instances, the magnetic fluxes entering the lateral surface of the body may exert radial forces on the body proportional to the magnetic fluxes in the radial magnetic control circuits.

In some implementations, the control magnetic flux may be produced by a control current in the excitation coil and be controllable to affect a total magnetic flux in the control magnetic circuit.

In some implementations, a method for exerting a radial electromagnetic force on a body configured to rotate about a rotational axis may include the following steps. A bias magnetic field may be created in air gaps between magnetic radial control poles in a radial control pole assembly and a body using a permanent magnet magnetized along the rotational axis with one of its poles attached to a face of the radial control pole assembly and the other pole magnetically coupled to the body without coming in mechanical contact with it. The magnet may be located in a close proximity of the body without coming into a mechanical contact with it.

In some instances, a control magnetic field may be generated in air gaps between magnetic radial control poles in a radial control pole assembly and a body by inducing control currents in control coils wound around radial magnetic poles and located radially outwards from the permanent magnet. The bias magnetic field and the control magnetic field may be superimposed resulting in a non-uniform distribution of a net magnetic field around the body leading to magnetic force being exerted on the body.

In some implementations, an electric machine system may include the following components. The electric machine system may include a base and a body having a rotational axis configured to move relative to a base. An electromagnetic actuator sub-assembly may be coupled to the base and may include a radial control pole assembly concentric with the rotational axis, separated from the body by radial gaps and comprising a plurality of radial poles adjacent a lateral facing surface of the body and adapted to communicate magnetic flux with the lateral facing surface of the body. The body and the plurality of radial poles within each pole assembly may be magnetically coupled and define a plurality of radial magnetic control circuits. The plurality of radial poles may be adapted to communicate magnetic fluxes with the lateral facing surface of the body. The system may further include a permanent magnet magnetized along the rotational axis with one of its poles attached to a face of the radial control pole assembly and the other pole magnetically coupled to the body without coming in mechanical contact with it. The magnet may be located in a close proximity of the body without coming into a mechanical contact with it. A control coil around each of the radial poles may be included located radially outwards from the permanent magnet and configured to produce control magnetic flux in the radial magnetic control circuits. Furthermore, the system may include one or more position sensors configured to sense a position of the body and at least one control electronics package configured to control the magnetic flux in the radial magnetic control circuits.

In certain implementations, the control electronics may vary currents in the control coils using information from the position sensor to exert electromagnetic forces on the body needed to maintain it supported at a specified radial position with respect to the base without coming to a mechanical contact with it.

In certain implementations, the body may be coupled to a driven load, the driven load comprising at least one of a flywheel, a compressor, a generator, or an expander.

In certain implementations, the body may be coupled to a driver, the driver comprising at least one of a motor, an engine, or a turbine.

In certain implementations, the body may be a rotor and the base may be a stator of an electric machine.

DETAILED DESCRIPTION

Magnetic bearings use magnetic fields to support objects without a mechanical contact. A portion of a magnetic bearing responsible for exerting electromagnetic forces on an object is called an electromagnetic actuator. Such actuators may benefit from using permanent magnets rather than coils with electrical currents to generate at least a portion of that magnetic field. Possible benefits include reduction in overall size and weight of a device, reduction of the power consumption and minimizing the number of connecting wires. In order to further reduce size, weight and cost of a magnetic bearing with a permanent magnet, it is necessary to utilize the magnet energy in the most efficient manner.

Figure 1A:
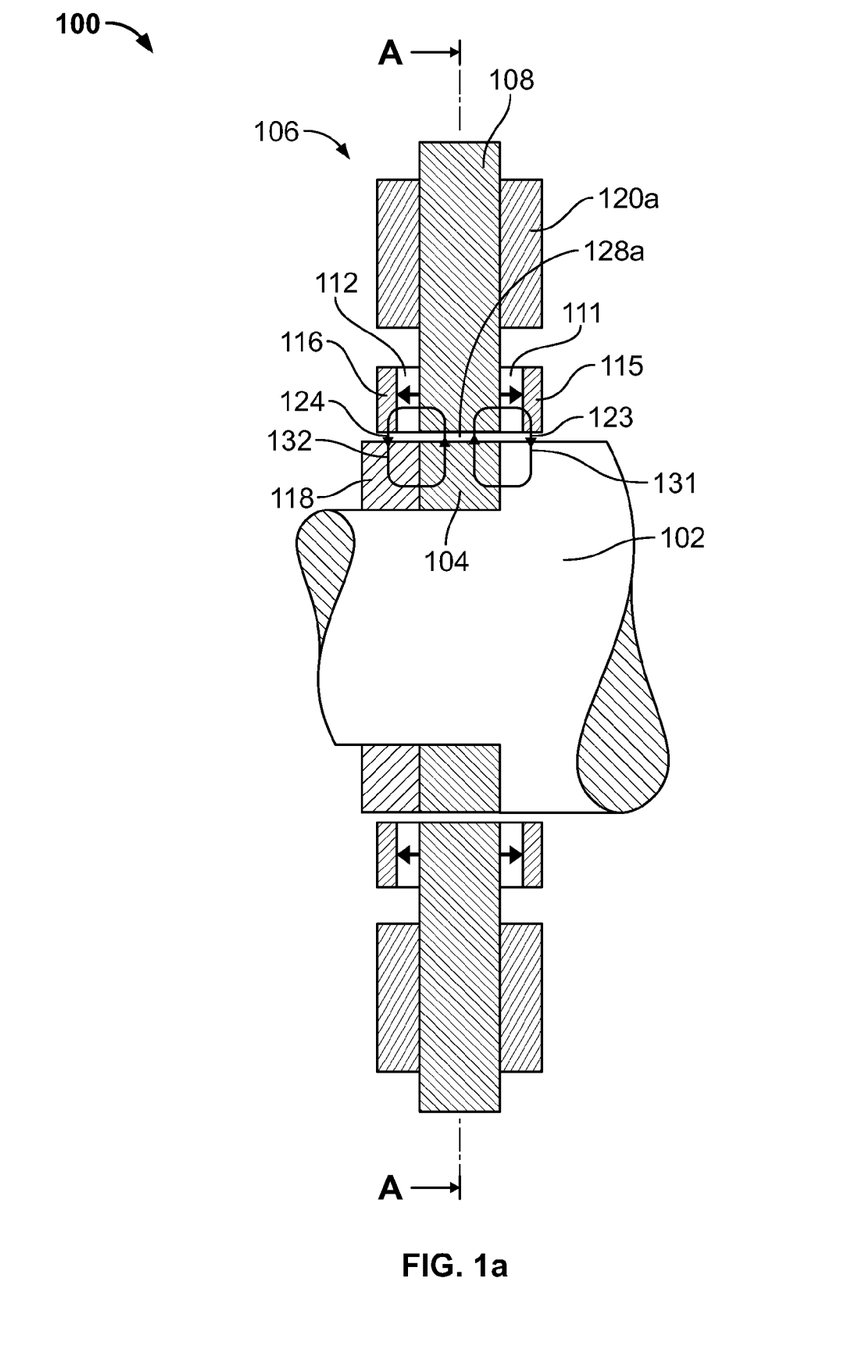
FIG. 1A is a side cross-sectional view of an embodiment of a radial electromagnetic actuator of the present disclosure.
Figure 1B:
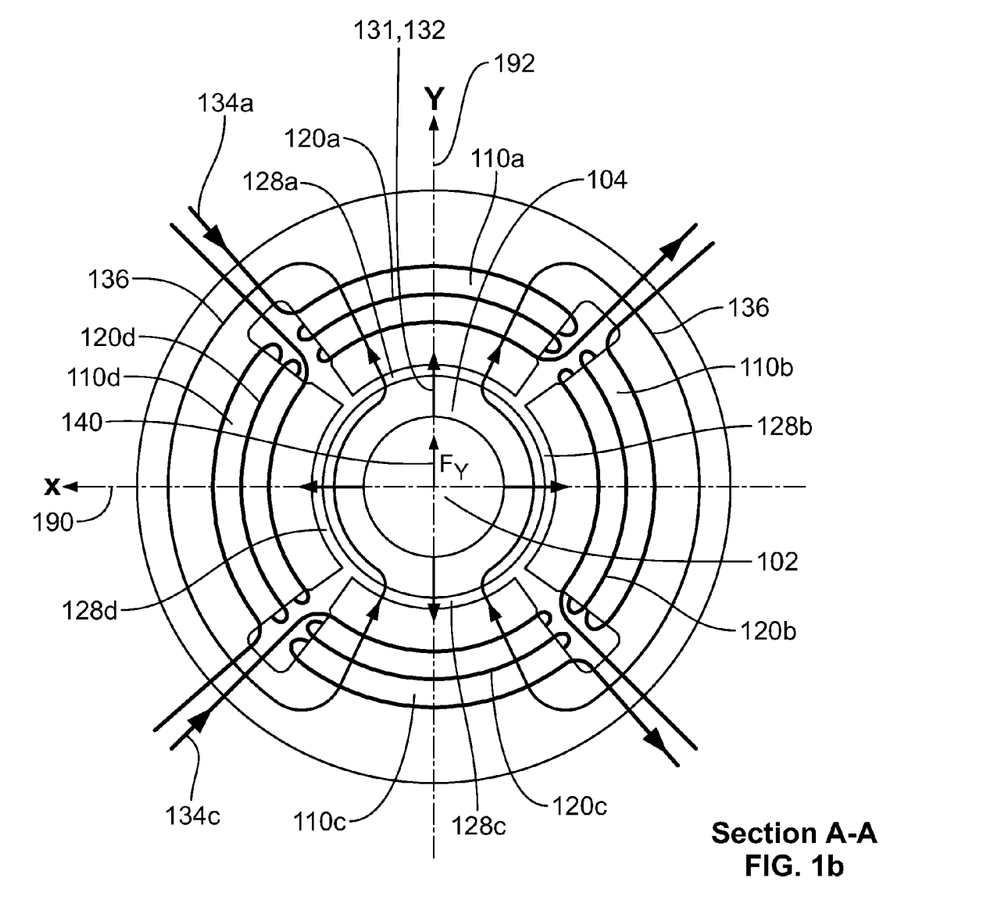
FIG. 1B is an axial cross-sectional views of the radial electromagnetic actuator of FIG. 1A.

FIG. 1A is a side cross-sectional schematic of an embodiment of the magnetic actuator in accordance with the present disclosure. The magnetic actuator 100 shown in FIG. 1A can produce controllable forces on an actuator target 104 firmly attached to a rotor 102 in the radial plane defined by X axis 190 and Y axis 192 (as shown in FIG. 1B). In this particular implementation the rotor 102 has to be made out of a soft-magnetic material. The actuator target 104 can be assembled of soft-magnetic conductive laminations stacked axially and electrically isolated from each other.

The stationary actuator portion 106 includes a radial control magnetic pole assembly 108 which comprises at least three radial control poles (four poles 110a-d shown in FIG. 1B) situated radially around the actuator target 104 and separated from it by a radial air gap 128 (each radial control pole assembly 108 is separated from the actuator target by a radial air gap, shown as radial gaps 128a-d). Radial control poles 110a-d may be made of a soft-magnetic material, in particular they may be assembled of soft-magnetic conductive laminations stacked axially and electrically isolated from each other. The radial stationary poles 110a-d are magnetically linked to each other on the outer diameter. Each radial control pole 110a-d has two axially-facing surfaces (i.e., in the +Z direction and the −Z direction). Each of the axially-facing surfaces of the radial control poles 110a-d are in magnetic communication with an axially magnetized permanent magnet (permanent magnets 111 and 112). The permanent magnets 111 and 112 are arranged so that identical poles of the permanent magnets 111 and 112 are in magnetic communication with the radial control pole. The permanent magnets 111 and 112 may be located radially close to the inner diameter of the radial control pole assembly 108. The other poles of the permanent magnets are equipped with soft-magnetic pole pieces 115 and 116, which are positioned close to the outer diameter of the rotor 102 in order to communicate radial magnetic flux with the rotor 102 and a soft-magnetic disk 118 mounted on the rotor 102, respectively.

Each of the radial poles 110a-d has one of the control coils 120a-d wound around it and located radially outwards from the magnets 111 and 112. For example, radial pole 110a has control coil 120a around it, radial pole 110b has control coil 120b around it, etc.

The radial control pole assembly 108, the actuator target 104, the rotor 102, the magnet pole piece 115, and the magnet 111 form a first bias magnetic circuit. The magnet 111 induces the bias magnetic flux 131 in this circuit which emanates from the outboard pole of the magnet 111, enters the pole piece 115, propagates radially from the pole piece 115 into the rotor 102 across the radial air gap 123, travels within the rotor 102 towards the actuator target 104, exits the actuator target 104 radially, crosses the radial air gaps 128a-128d, enters the radial control pole assembly 108 and returns to the magnet 111.

Similarly, the radial control pole assembly 108, the actuator target 104, the soft-magnetic disk 118, the magnet pole piece 116, and the magnet 112 form the second bias magnetic circuit. The magnet 112 induces the bias magnetic flux 132 in this circuit which emanates from the outboard pole of the magnet 112, enters the pole piece 116, propagates radially from the pole piece 116 into the soft-magnetic disk 118 across the radial air gap 124, travels within the soft-magnetic disk 118 towards the actuator target 104, exits the actuator target 104 radially, crosses the radial air gaps 128a-128d, enters the radial control pole assembly 108 and returns to the magnet 112.

Figure 2:
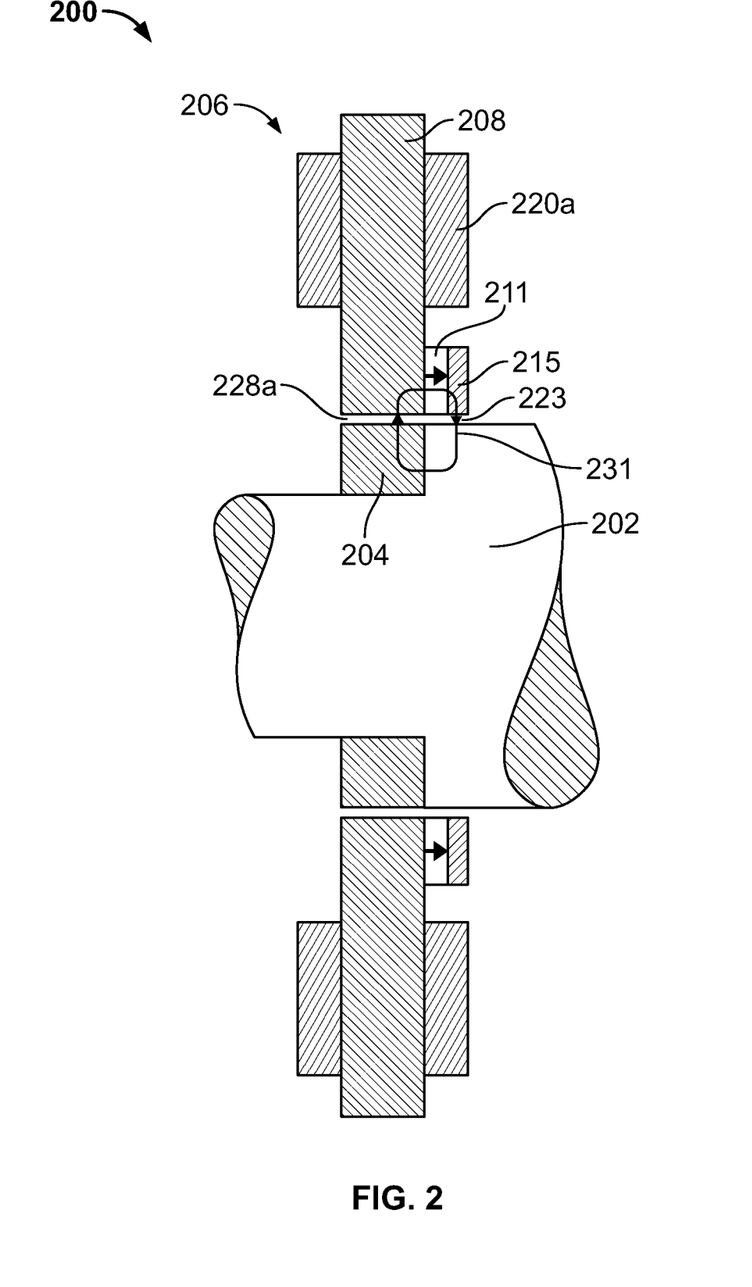
FIG. 2 is a side cross-sectional view of another example radial electromagnetic actuator in accordance with the present disclosure.

The fluxes 131 and 132 add up in the radial gaps 128a-128d between the radial poles 110a-110d and the actuator target 104. In implementations where the poles 110a-110d are composed of insulated electrical steel laminations stacked axially, using two magnets 111 and 112 attached to two opposite faces of the radial control pole assembly 108 to generate radial bias magnetic flux in the air gaps 128a-128d instead of a single magnet attached to one of the faces has a benefit of achieving a more uniform axial distribution of a radial flux in the radial gaps 128a-128d with a higher mean value because the magnetic flux travelling across a lamination stack tends to attenuate due to the presence of non-magnetic insulation between laminations. In some applications, however, it may be beneficial to generate the entire bias magnetic flux using a magnet on one side only, e.g. due to geometrical envelope restrictions. Such a system is illustrated in FIG. 2.

Because the magnets 111 and 112 are located in close proximity to the radial gaps 123, 124 and 128a-d separating the stationary and rotating parts of the assembly, the magnetic flux leakage within the stationary part of the magnetic circuit is reduced and most of the magnetic flux generated by the magnets 111 and 112 reaches the gaps 123, 124 and 128a-d where they may contribute to generating electromagnetic forces on the rotating part of the assembly. This allows for an efficient use of the magnets 111 and 112 when the needed bias flux could be achieved with a minimal amount of a magnetic materials. This also minimizes axial thicknesses of the radial poles 110a-110d and the magnet pole pieces 115 and 116, which otherwise would have to be made thicker in order to accommodate additional leakage magnetic fluxes within the stationary part of the assembly.

When the rotor 102 is centrally positioned and there are no currents in the radial control windings 120a-d, the bias flux densities under each pole 110a-d are equal because of the symmetrical nature of the system. Therefore, there is no radial force produced on the rotor 102. By energizing some of the radial control windings, 120a-d, the flux distribution may be altered so as to develop a radial force. For example, FIG. 1B shows windings 120a and 120c energized with control currents 134a and 134c respectively. These currents produce radial control flux 136.

In the radial air gap 128a control flux 136 adds to the magnetic bias fluxes 131 and 132, whereas in the radial air gap 128c, it subtracts from the magnetic bias fluxes 131 and 132. Due to the higher resulting net magnetic flux densities in the radial air gap 128a compared to the radial air gap 128c, radial electromagnetic force $F_Y$ 140 acts on the actuator target 104 and, consequently, on the rotor 102. In FIG. 1B, this force $F_Y$ 140 is directed upward on the page.

Continuing with FIG. 1B, the portion of the electromagnetic force $F_Y$ 140 exerted on actuator target 104 by the upper pole 110a associated with winding 120a can be calculated as $$F_{rad1} = \frac{1}{2\mu_0}(B0_{rad} + B1_{rad})^2 \cdot A_{rad},$$

where $B0_{rad}$ is the density of the combined bias fluxes 131 and 132 in the radial gap 128a, $B1_{rad}$ is the density of the radial control flux 136 in the radial gap 128a associated with windings 120a, and $A_{rad}$ is the projection of the pole surface adjacent to the radial air gap 128a on a plane normal to the pole axis (Y axis as illustrated in FIG. 1B).

Similarly, the electromagnetic force exerted on the actuator target 104 by the lower pole 110c associated with windings 120c can be calculated as:

$$F_{rad2} = \frac{1}{2\mu_0}(B0_{rad} - B1_{rad})^2 \cdot A_{rad}.$$

The net radial force on the actuator target pole 104 will then be:

$$F_{rad} = F_{rad1} - F_{rad2} =$$
$$\frac{A_{rad}}{2\mu_0}\{(B0_{rad} + B1_{rad})^2 - (B0_{rad} - B1_{rad})^2\} = 2\frac{A_{rad}}{\mu_0}B0_{rad}B1_{rad}$$

If radial control currents 134a and 134c are equal to each other and have a value $I_{rad}$, the radial control magnetic flux density $B1_{rad}$ will be proportional to $I_{rad}$, and consequently, the radial force $F_{rad}$ will be proportional to $I_{ad}$. Although illustrated and described above in the Y direction, the same features apply in the X direction. Therefore, this implementation allows the electromagnetic actuator 100 to produce bidirectional electromagnetic forces along two radial axes, designated in FIG. 1B as X 190 and Y 192.

The radial control pole assembly 108 and actuator target 104 can be composed of electrical steel laminations electrically isolated from each other and stacked together in the axial direction in order to minimize eddy currents that can be induced when the radial control currents such as 134a and 134c vary in time in order to produce a time-varying force. The actuator target 104 in addition may need to be laminated to minimize eddy currents induced in it when the rotor 102 spins. In some implementations, the rotor 102 is composed of a soft-magnetic material.

FIG. 2 illustrates another embodiment of the actuator of the present disclosure. FIG. 2 is a side cross-sectional view of another example radial electromagnetic actuator 200 in accordance with the present disclosure. The difference from the arrangement shown in FIGS. 1A and 1B is that the bias flux 231 is generated by a single magnet 211 installed on one side of the radial pole assembly 208. In implementations where the poles 110a-110d are composed of insulated electrical steel laminations stacked axially, the arrangement shown in FIGS. 1A and 1B may achieve a more uniform axial distribution of a radial flux in the radial gaps 128a-128d with a higher mean value because the magnetic flux travelling across a lamination stack tends to attenuate due to the presence of non-magnetic insulation between laminations. In some applications, however, it may be beneficial to use the arrangement of FIG. 2, e.g., to address geometrical envelope restrictions. The rest of the operation of the magnetic bearing shown in FIG. 2 is analogous to the operation of the magnetic bearing shown in FIG. 1.

Figure 3:
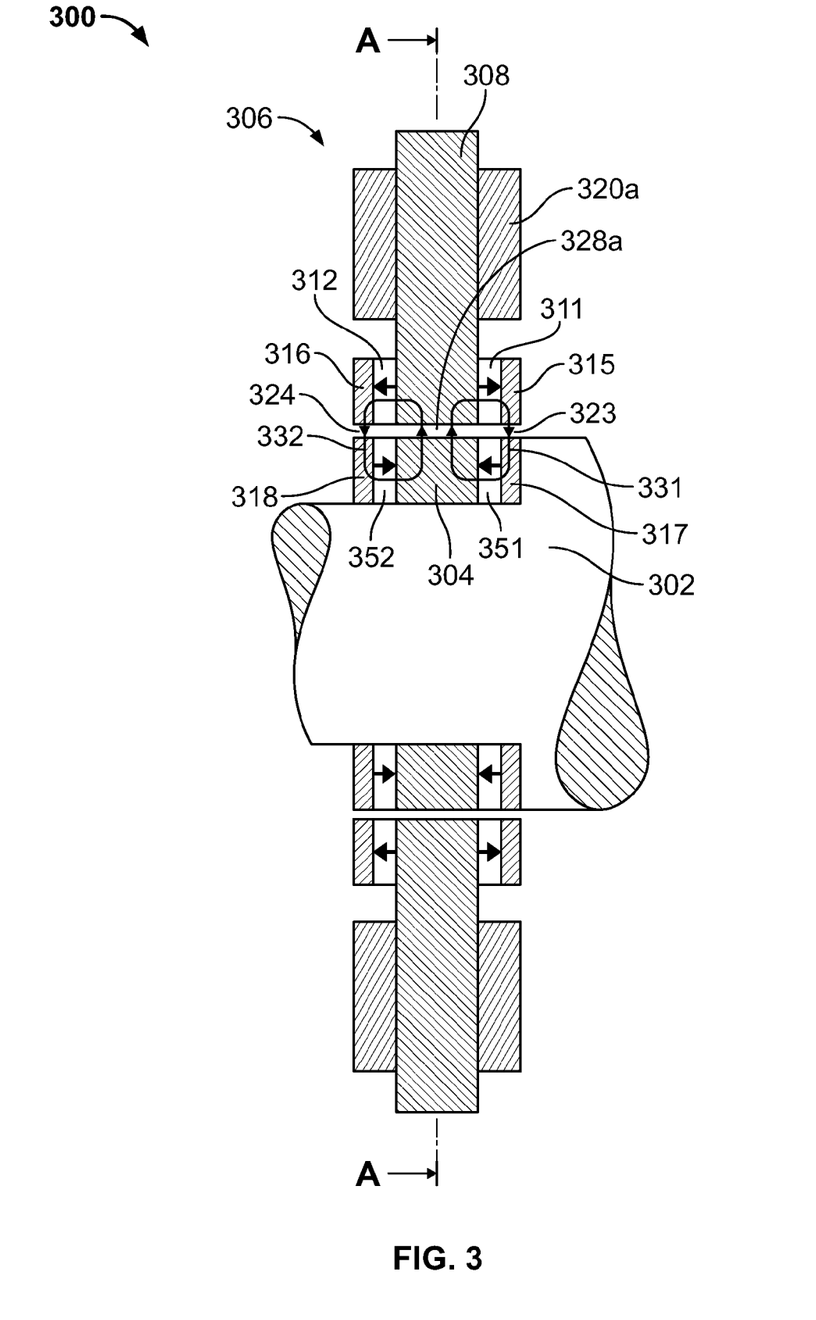
FIG. 3 is a side cross-sectional view of another example of a radial electromagnetic actuator of the present disclosure.

FIG. 3 illustrates another example implementation of the actuator of the present disclosure where additional magnets mounted on the rotor are used to help generating the bias magnetic field. FIG. 3 is a side cross-sectional schematic of another example a magnetic actuator 300 in accordance with the present disclosure. The magnetic actuator 300 shown in FIG. 3 can produce controllable radial forces on an actuator target 304 firmly attached to a rotor 302. For example, the magnetic actuator 300 can produce controllable forces on an actuator target 304 firmly attached to a rotor 302 in the radial plane defined by X-axis and Y-axis (as shown in FIG. 1B). In this particular implementation, the rotor 302 is made out of a non-magnetic material. The actuator target 304 can be assembled of soft-magnetic conductive laminations stacked axially and electrically isolated from each other.

The stationary actuator portion 306 has similar features as the stationary actuator portion 106 shown in FIG. 1A. Stationary actuator portion 306 includes a radial control magnetic pole assembly 308 which comprises at least three radial poles situated around the actuator target 304 and separated from it by radial air gaps 328. Radial poles 310 may be made of a soft-magnetic material, in particular they may be assembled of soft-magnetic conductive laminations stacked axially and electrically isolated from each other. The radial poles 310 are magnetically linked to each other on the outer diameter. The axial faces of the poles are engaged with identical poles of two axially magnetized permanent magnets 311 and 312 located radially close to the inner diameter of the radial pole assembly 308. The free magnet poles are equipped with soft-magnetic pole pieces 315 and 316 which are positioned close to the outer diameter of the rotor 302 in order to communicate radial magnetic flux with soft-magnetic disk 317 and 318 mounted on the rotor 302. Two additional disk-shaped rotor magnets 351 and 352 are mounted on the rotor sandwiched between the actuator target 304 and soft-magnetic disks 317 and 318 respectively.

The rotor magnets 351 and 352 are arranged to face the actuator target 304 with identical poles which polarity is opposite to the polarities of the poles magnets 311 and 312 facing the radial pole assembly 308.

Each of the radial poles 310 has one of the control coils 320 wound around it and located radially outwards from the magnets 311 and 312.

The radial pole assembly 308, the actuator target 304, the rotor magnet 351, the rotor disk 317, the magnet pole piece 315 and the magnet 311 form the first bias magnetic circuit. The magnets 311 and 351 induce the bias magnetic flux 331 in this circuit which emanates from the outboard pole of the magnet 311, enters the pole piece 315, propagates radially from the pole piece 315 into the soft-magnetic rotor disk 317 across the radial air gap 323, travels axially within the rotor magnet 351 towards the actuator target 304, exits the actuator target 304 radially, crosses the radial air gaps 328, enters the radial pole assembly 308 and returns to the magnet 311.

Similarly, the radial pole assembly 308, the actuator target 304, the rotor magnet 352, the rotor disk 318, the magnet pole piece 316 and the magnet 312 form the second bias magnetic circuit. The magnets 312 and 352 induce the bias magnetic flux 332 in this circuit which emanates from the outboard pole of the magnet 312, enters the pole piece 316, propagates radially from the pole piece 316 into the soft-magnetic rotor disk 318 across the radial air gap 324, travels axially within the rotor magnet 352 towards the actuator target 304, exits the actuator target 304 radially, crosses the radial air gaps 328, enters the radial pole assembly 308 and returns to the magnet 312.

The rest of the operation of the magnetic bearing shown in FIG. 3 is analogous to the operation of the magnetic bearing shown in FIG. 1. Having magnets 351 and 352 on the rotor as in FIG. 3 allows the magnets 311 and 312 on the stator to be smaller, and, consequently, allowing the stationary actuator portion 306 to be smaller. Other magnetic arrangements can be used on the rotor, such as those described in U.S. Pat. No. 8,378,543 without departing from the scope of the present disclosure.

Figure 4:
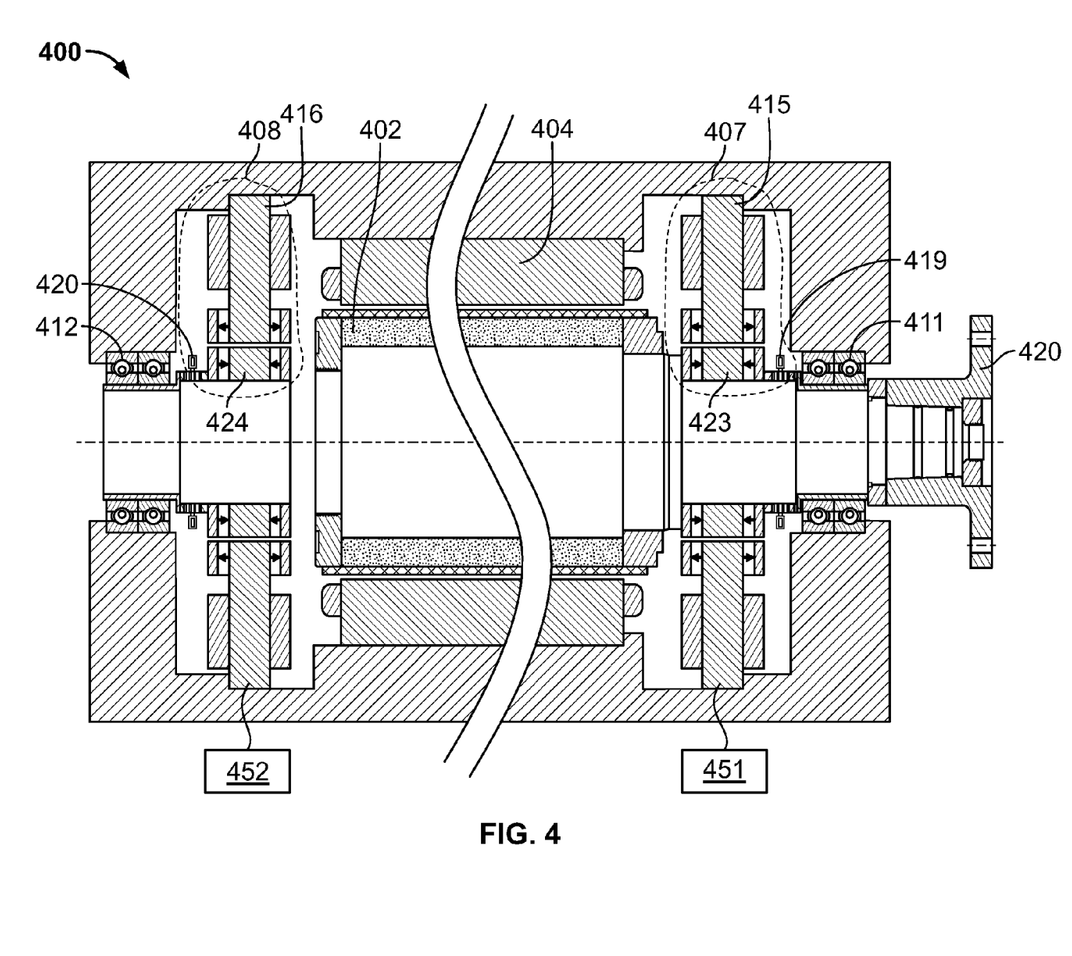
FIG. 4 is a side cross-sectional view of an electrical machine equipped with an Active Magnetic Bearing (AMB) system incorporating an embodiment of the radial electromagnetic actuator of the present disclosure.

In some aspects, the proposed radial homopolar permanent-magnet-biased electromagnetic actuator 100 may be utilized as a part of an Active Magnetic Bearing (AMB) system to support an object without a mechanical contact. FIG. 4 shows an example of using an AMB system in a rotational electric machine 400. The electric machine 400 shown in FIG. 4 has a rotor 402 and a stator 404. In embodiments, the rotor 402 of the electric machine 400 is supported radially without mechanical contact by means of front and rear radial Active Magnetic Bearings (AMBs) 407 and 408. The AMBs 407 and 408 may also provide some passive axial rotor alignment using the interaction between parts of a bias magnetic circuit mounted on the rotating and stationary parts of the AMBs and energized with permanent magnets. When installed, the rotor 402 of the electric machine 400 may be coupled through a coupling 490 mounted on the right end of the rotor 402 to a shaft of another piece of equipment (not shown) driven by (in the case of a motor) or driving (in the case of a generator) the electric machine 400. When the AMBs 407 and 408 are not working, the rotor rests on the mechanical backup bearings 411 and 412. The front backup bearing 411 provides the axial support of the entire rotor 402 and a radial support of the rotor front end, whereas the rear backup bearing 412 provides only radial support of the rear end of the rotor 402. There are sufficient radial clearances between the inner diameters of the mechanical backup bearings 411, 412 and the outer diameters of the rotor portions interfacing with those bearings to allow the rotor 402 to be positioned radially without touching the backup bearings 411 and 412, when the AMBs 407 and 408 are activated. Similarly, there are sufficient axial clearances between the backup bearings 411, 412 and the portions of the rotor 402 interfacing with those bearings to allow the rotor 402 to be positioned axially without touching the backup bearings 411 and 412 using magnetic interaction between parts of bias magnetic circuits mounted on the rotating and stationary parts of the AMBs 407 and 408 and energized with permanent magnets.

The front radial AMB 407 may include an electromagnetic actuator 415 per present disclosure, front radial position sensors 419 and control electronics 451. The electromagnetic actuator 415 is capable of exerting radial forces on the actuator target 423 firmly mounted on the front end of the rotor 402. The rear radial AMB 408 may include an electromagnetic actuator 416 per present disclosure, rear radial position sensors 420 and control electronics 452. The electromagnetic actuator 416 is capable of exerting radial forces on the actuator target 424 firmly mounted on the rear end of the rotor 402. The position sensors can provide information to the control electronics to exert electromagnetic forces on the body needed to maintain it supported at a specified radial position with respect to the base without coming to a mechanical contact with it.

Signals from the radial position sensors 419 and 420 are input into the control electronics 451 and 452 respectively, which generates currents in the control coils of the electromagnetic actuators 415 and 416 whenever it finds that the rotor is deflected from the desired position such that these currents produce forces pushing the rotor back to the desired position.

The control electronics 451 and 452 may be combined in a single module and may share some components.

Figure 5:
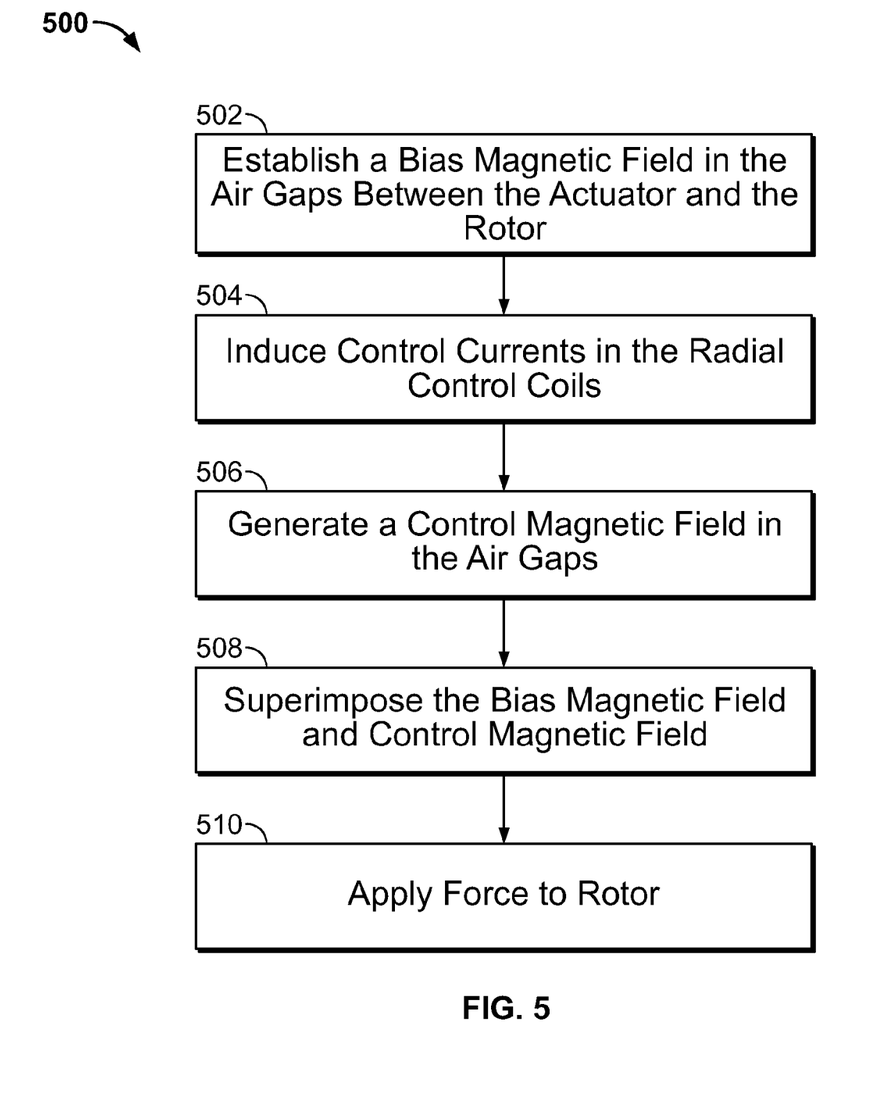
FIG. 5 is a process flow diagram of an example process for generating radial electromagnetic forces.

FIG. 5 is a process flow diagram of an example process 500 for generating radial electromagnetic forces. A bias magnetic field can be established in air gaps between magnetic radial control poles and the body (502) using a permanent magnet magnetized along the rotational axis and separated from the body by an air gap. The magnetic radial control poles are part of a radial control pole assembly. One of the magnetic poles of the magnet is attached to an axially facing surface of the radial control pole assembly whereas the other pole of the magnet is magnetically coupled to the body.

Control currents can be induced in control coils wound around radial magnetic poles and located radially outwards from the permanent magnet (504) in order to generate a control magnetic field in the air gaps (506). The bias magnetic field and control magnetic field are superimposed (508), resulting in a non-uniform distribution of a net magnetic field around the body leading to magnetic force being exerted on the body (510).

The present disclosure describes embodiments of an electromagnetic actuator to generate radial forces. Other embodiments and advantages are recognizable by those of skill in the art by the forgoing description and the claims.

What is claimed is:

1. An electromagnetic actuator comprising:
    a body having a rotational axis;
    a radial control magnetic pole assembly concentric with the rotational axis and comprising at least three radial control poles adjacent to and separated from a lateral surface of the body by radial control air gaps, the radial control poles configured to communicate magnetic flux with the lateral surface of the body, the radial control poles magnetically coupled to each other on an outer periphery of the radial control pole assembly, the radial control poles magnetically coupled to the body forming a plurality of radial control magnetic circuits configured to propagate radial control magnetic fluxes in planes orthogonal to the rotational axis;

a first permanent magnet magnetized along the rotational axis, the first permanent magnet having a first magnetic pole of the first permanent magnet residing on a first axially facing surface of the radial control magnetic pole assembly, located proximate of the lateral surface of the body and separated from the body by a first magnet air gap;

a second permanent magnet magnetized along the rotational axis, the second permanent magnet having a first magnetic pole of the second permanent magnet in contact with a second axial face of the radial control magnetic pole assembly which is opposite the first axially facing surface of the radial control magnetic pole assembly, the second permanent magnet located in a close proximity of the lateral surface of the body and separated from the body by a second magnet air gap, the first magnetic pole of the second permanent magnet in contact with the second axial face of the radial control magnetic pole assembly is of the same polarity as the first magnetic pole of the first permanent magnet;

a first magnet pole piece in contact with a second magnetic pole of the first permanent magnet, separated from the body by a first magnet pole piece radial air gap and configured to communicate magnetic flux with the lateral surface of the body, the body, the radial control magnetic pole assembly, the first permanent magnet and the first magnet pole piece defining a first bias magnetic circuit, wherein the first permanent magnet generates a bias flux in the first bias magnetic circuit, the bias magnetic flux emanates from the second magnetic pole of the first permanent magnet, enters the first magnet pole piece, propagates radially from the first magnet pole piece into the body across the first magnet pole piece radial air gap, radially exits the body across the radial control pole airgaps, and returns into the first magnetic pole of the first permanent magnet through the radial control magnetic pole assembly;

a second magnet pole piece in contact with a second magnetic pole of the second permanent magnet; the body, the radial magnetic pole assembly, the second permanent magnet, and the second magnet pole piece defining a second bias magnetic circuit, wherein the second permanent magnet generates a second bias magnetic flux in the second bias magnetic circuit, the second bias flux emanates from the second magnetic pole of the second permanent magnet, enters the second magnet pole piece, propagates radially from the second magnet pole piece into the body across the second magnet pole piece radial air gap, radially exits the body across the radial control pole airgaps and returns into the first magnetic pole of the second permanent magnet thru the radial control magnetic pole assembly; and a control coil wound around each of the radial control poles located radially outwards from the first permanent magnet and configured to produce control magnetic flux in the radial control magnetic control circuits.

2. The actuator of claim 1, wherein the bias magnetic flux and the control magnetic flux entering the lateral surface of the body exert radial forces on the body.

3. The actuator of claim 2, wherein the radial forces are proportional to the control magnetic flux in the radial magnetic control circuits.

4. The actuator of claim 1, wherein the control magnetic flux is produced by a control current in the excitation coil, the control current controllable to affect a total magnetic flux in the control magnetic circuit.

5. The actuator of claim 1, further comprising a third permanent magnet magnetized along the rotational axis and a fourth permanent magnet magnetized along the rotational axis, the third permanent magnet and the fourth permanent magnet integrated into the body, wherein a first magnetic pole of the first permanent magnet is axially aligned with a first magnetic pole of the third permanent magnet, wherein a polarity of the first magnetic pole of the first permanent magnet is opposite a polarity of the first magnetic pole of the third permanent magnet, wherein the third permanent magnet is added to the first bias magnetic circuit and the first bias magnetic flux is generated by both the first permanent magnet and the third permanent magnet in an additive manner, wherein a first magnetic pole of the second permanent magnet is axially aligned with a first magnetic pole of the fourth permanent magnet, wherein a polarity of the first magnetic pole of the second permanent magnet is opposite a polarity of the first magnetic pole of the fourth permanent magnet, wherein the fourth permanent magnet is added to the second bias magnetic circuit and the second bias magnetic flux is generated by both the second permanent magnet and the fourth permanent magnet in an additive manner.

6. The actuator of claim 1, wherein a portion of the body aligned with the radial control magnetic pole assembly along the rotational axis of the body is continuous and has a circular cross-section.

7. An electromagnetic actuator comprising:
a body having a rotational axis;
a radial control magnetic pole assembly concentric with the rotational axis and comprising at least three radial control poles adjacent to and separated from a lateral surface of the body by radial control air gaps, the radial control poles configured to communicate magnetic flux with the lateral surface of the body, the radial control poles magnetically coupled to each other on an outer periphery of the radial control pole assembly, the radial control poles magnetically coupled to the body forming a plurality of radial control magnetic circuits configured to propagate radial control magnetic fluxes in planes orthogonal to the rotational axis;
a first permanent magnet magnetized along the rotational axis, the first permanent magnet having a first magnetic pole residing on an axially facing surface of the radial control magnetic pole assembly, located proximate of the lateral surface of the body and separated from the body by a magnet air gap;
a second permanent magnet magnetized along the rotational axis and integrated into the body, a first magnetic pole of the first permanent magnet is axially aligned with a first magnetic pole of the second permanent magnet, wherein a polarity of the first magnetic pole of the first permanent magnet is opposite a polarity of the first magnetic pole of the second permanent magnet, wherein the second permanent magnet is added to the bias magnetic circuit and the bias magnetic flux is generated by both the first permanent magnet and the second permanent magnet in an additive manner;
a magnet pole piece in contact with a second magnetic pole of the first permanent magnet, separated from the body by a magnet pole piece radial air gap and configured to communicate magnetic flux with the lateral surface of the body; the body, the radial control magnetic pole assembly, the first permanent magnet and the magnet pole piece defining a bias magnetic circuit, wherein the first permanent magnet generates a bias flux in the bias magnetic circuit, the bias magnetic flux emanates from the second magnetic pole of the first permanent magnet, enters the magnet pole piece, propagates radially from the magnet pole piece into the body across the magnet pole piece radial air gap, radially exits the body across the radial control pole airgaps, and returns into the first magnetic pole of the first permanent magnet through the radial control magnetic pole assembly; and a control coil wound around each of the radial control poles located radially outwards from the first permanent magnet and configured to produce control magnetic flux in the radial control magnetic control circuits.

8. The actuator of claim 7, wherein the bias magnetic flux and the control magnetic flux entering the lateral surface of the body exert radial forces on the body.

9. The actuator of claim 8, wherein the radial forces are proportional to the control magnetic flux in the radial magnetic control circuits.

10. The actuator of claim 7, wherein the control magnetic flux is produced by a control current in the excitation coil, the control current controllable to affect a total magnetic flux in the control magnetic circuit.

11. The actuator of claim 7, wherein a portion of the body aligned with the radial control magnetic pole assembly along the rotational axis of the body is continuous and has a circular cross-section.

* * * * *